United States Patent [19]
Whittington

[11] 3,747,196
[45] July 24, 1973

[54] AUTOMATIC TRANSMISSION REVISION AND METHOD
[76] Inventor: Pat K. Whittington, 540 N. Utah Ave., Idaho Falls, Idaho
[22] Filed: Aug. 25, 1971
[21] Appl. No.: 174,668

[52] U.S. Cl............ 29/401, 29/526, 74/606, 287/53 SS, 287/DIG. 3, 285/2, 285/3
[51] Int. Cl..... B22d 19/10, B23p 7/00, B23p 19/00
[58] Field of Search............ 312/352; 287/DIG. 3; 74/606; 180/70, 14, 14.5; 29/526, 401

[56] References Cited
UNITED STATES PATENTS
1,982,915  12/1934  Jenks........................ 287/DIG. 3

FOREIGN PATENTS OR APPLICATIONS
381,403  0/1932  Great Britain............. 287/DIG. 3

Primary Examiner—Paul R. Gilliam
Attorney—M. Ralph Shaffer

[57] ABSTRACT

An automotive automatic transmission revised structure wherein the outer sprag race of the transmission is positively secured to the rear transmission bell, to correct for prior inadvertent stripping or wearing down of engagement splines proximate this transmission area. The subject revision requires minimal expense and obviates the necessity of replacement of expensive parts.

1 Claim, 4 Drawing Figures

PATENTED JUL 24 1973 3,747,196

INVENTOR.
PAT K. WHITTINGTON
BY M. Ralph Shaffer
HIS ATTORNEY

AUTOMATIC TRANSMISSION REVISION AND METHOD

The present invention relates to automotive, automatic transmissions, and, more particularly, to an automatic transmission revision wherein the rear bell housing and flange hub supporting the rear transmission shaft are positively affixed to the outer sprag race of the transmission.

In the past, transmission casings, bell housings, and the like, have been fabricated from aluminum. Conventionally, splines are machined into the aluminum side wall area to accommodate an engagement of the outer splines of the outer sprag race of the transmission. The outer sprag race is conventionally of hardened steel. Heretofore, the outer sprag race has not been designed to be positively affixed to the interior of the bell housing, but rather simply is splined thereto to hopefully prevent rotation of the sprag race relative to the bell housing.

In the past, transmission rework has been made difficult and expensive, owing to the shearing or wearing down of the aluminum splines should the outer sprag race or equipment associated therewith be caused to malfunction. Since aluminum is soft, the splines heretofore used do not securely hold the sprag race in position.

What is needed, therefore, is a concept of including shear bolts for disposition through the transmission bell housing, to be threaded into the outer sprag race of the transmission. The shear bolts preferably include annular slots or recesses providing shear planes in the event of malfunction. In such case, then merely the bolts would shear rather than the transmission self-destruct.

In accordance with the principles of the present invention, the bell housing and its flange are bolted together, with the ends of such bolts being constructed for threading into the outer sprag race of the transmission. The outer sprag race is itself drilled and tapped, preferably through its spring-and-roller-bearing retainer, so as to threadedly receive and engage the subject bolts. As to the rework, the threads normally provided for the bolts at the housing are drilled out so as to leave smooth bores for the bolts to pass through the housing and thread into the outer sprag race.

Accordingly, a principal object of the present invention is to provide a new and improved transmission construction for automotive vehicles.

A further object of the invention is to provide improvement in transmission rework wherein the outer sprag race thereof is positively affixed against rotation by being bolt-mounted to the bell housing of the transmission.

A further object of the invention is to provide a new and improved method of transmission rework wherein the usual bolts used at the aft end of the transmission are replaced, the threaded bores of the bell housing drilled out, and the outer sprag race reworked so as to provide for a threaded reception of the subject replacement bolts.

An additional object is to provide a transmission rework useful to positively secure the sprag race of a transmission to its bell housing should the transmission become the subject of rework, owing to stripping of bell housing splines normally engaging the outer splines of the sprag race.

It will be seen from the foregoing description that the present invention provides a novel and useful way of reworking a transmission where the aluminum splines of the bell housing become stripped. Thus, instead of the transmission rebuilder having to supply an entirely new bell housing, he merely reworks the outer sprag race thereof and bolts it positively to the bell housing. The bolts used preferably include shear plane breakage points such that a subsequent malfunction will merely cause the bolts to shear, and not otherwise damage the equipment. Subsequently, the bolts merely can be replaced and rethreaded into the reworked sprag race, as hereinafter indicated.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 2:
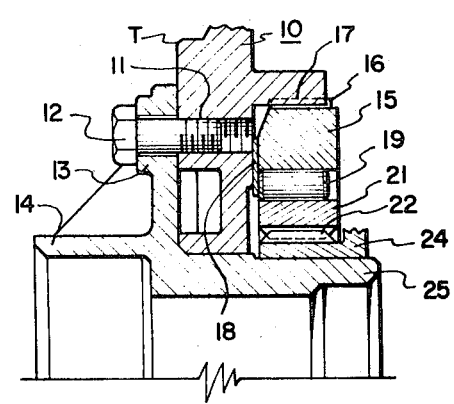
FIG. 2 is an enlarged, fragmentary detail shown, principally in section, of a portion of the transmission of FIG. 1 illustraing the configuration of such transmission prior to rework.

In the drawings, the bell housing 10 of transmission T is conventionally drilled and tapped at a plurality of bores 11, see FIG. 2. The same receive machine bolts 12 a plurality of which are disposed through bosses 13 of flange 14. The latter, of course, receives the output transmission shaft. Outer sprag race 15 is conventional in form and includes outer splines 16 which mesh with splines 17 of bell housing 10. The outer sprag race 15 includes a conventional spring and bearing retainer 18 for retainer roller bearings 19 and spring 20. Inner sprag race 21 includes plural splines 22 which mesh with splines 23 of cylindrical housing 24. Housing 24 is fitted over stub cylindrical portion 25 of flange 14 in the manner indicated.

Figure 1:
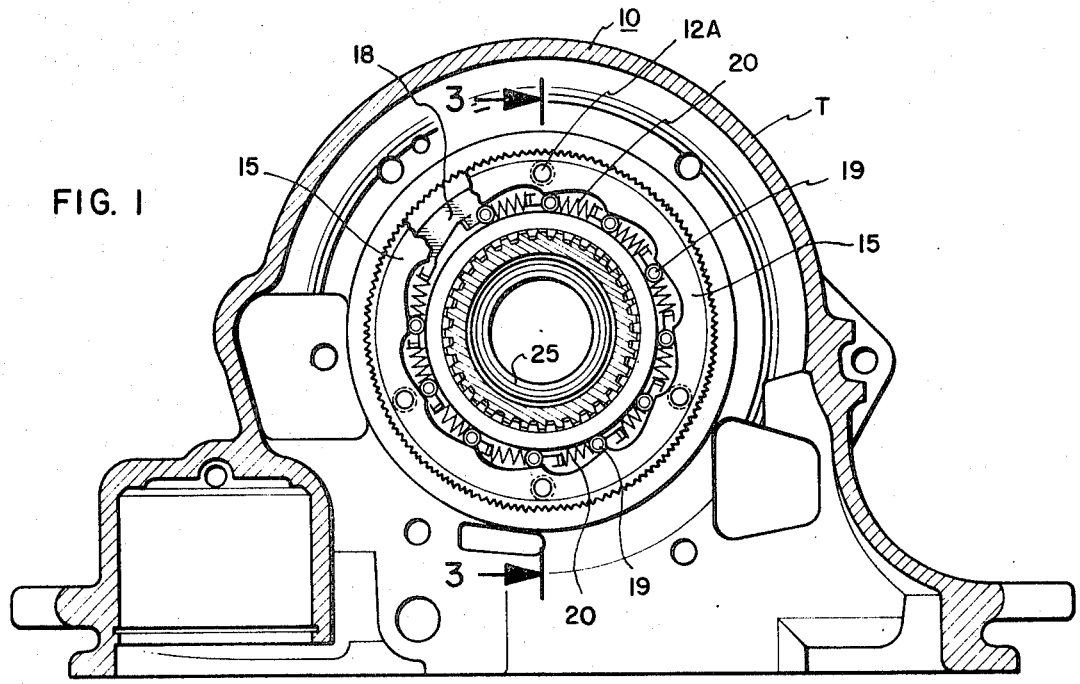
FIG. 1 is an elevation, principally shown in sectional view, of the aft portion of a Torque Flight transmission (Chrysler Corporation automative transmission, years 1962–1971), the section plane is taken along the line 1-1 in FIG. 1A.
Figure 1A:
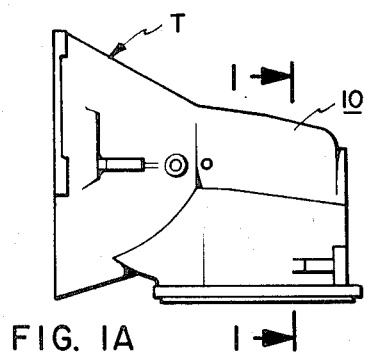
FIG. 1A is a side-elevation outline drawing of a subject transmission which is to be reworked as per FIG. 1.

In operation, the structure of FIGS. 1 and 2 is strictly conventional, the same forming the aft end portion of the Torque Flight transmission, years 1962 through 1971, a product of the Chrysler Corporation.

Housing 24, again, is a cylindrical housing for the rear planetary and reverse band portion of the transmission.

In the FIG. 2 embodiment the bolt structure at 12 is used simply to secure the flange 14 to bell housing 10.

Figure 3:
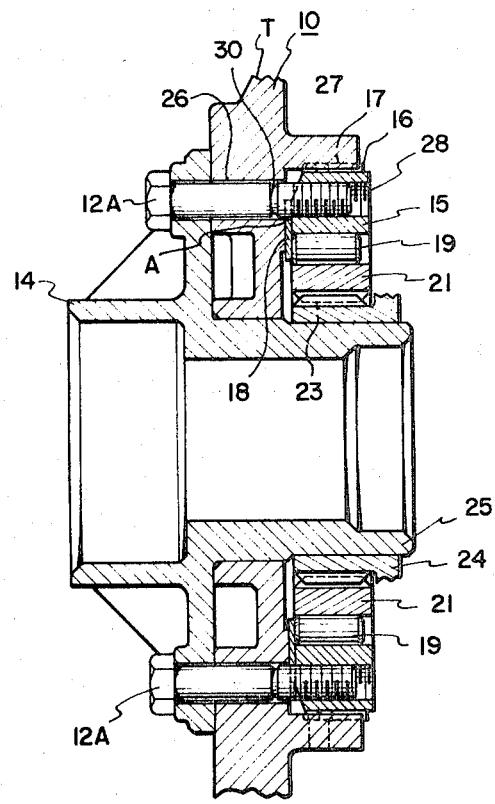
FIG. 3 is similar to FIG. 2 but is taken along the line 3-3 in FIG. 1, illustrating the reworked transmission.

In FIG. 3 a modification is illustrated, which modification comprises the present invention. In FIG. 3 it is seen that the bell housing 10, now is provided with smooth apertures 26. These may be formed by drilling out the threads in aperture 11, see FIG. 2, such that the modified apertures 11 now comprise apertures 26.

Bolts 12A are substituted for bolts 12 and this time are elongated such that threaded portions thereof thread into apertures 28 of the outer sprag race. Thus sprag race 15, in FIG. 2, is annealed, then drilled and tapped at several points (28) around its circle, and finally retempered. The bearing retainer may likewise be provided with aligned apertures A.

Bolts 12A are preferably supplied with individual annular recesses 30 serving as shear plane breakage points.

Accordingly, the older transmission design, as illustrated in FIG. 2, frequently produced a ripping out, shearing off, or wearing down of the splines at 16 and 17. Such a condition required a great deal of rework and replacement as to the subject transmission. In the present invention, the outer sprag race, as reworked as shown in FIG. 3, and identified as is, in positively affixed to the subject bell housing 10 by bolts 12A. Accordingly, no reliance is now placed upon the worn splines holding, but rather there is a positive connection via bolt means 12A of flange 14 to the bell housing 10. In this way, rework of the aluminum bell housing is avoided.

Accordingly, what is provided is a positive connection as between the bell housing of the aft end of the transmission and the outer sprag race thereof, this to insure that there will be no reliance upon splines at the outer periphery of the outer sprag race, that is, the splines in the aluminum cast bell housing 10.

In process, what is performed on the outer sprag race is to first anneal, then drill, then tap, and then retemper the same, in order to provide a reworked sprag race with the threaded apertures provided at 28 as in FIG. 3.

Accordingly, the present invention provides a new structure for aluminum cast bell housings relating to the aft end of automotive transmissions, wherein the engagement of such bell housing and particularly the spline connected thereto is made positive relative to the included outer sprag race transmission, this to insure that there will not be a shearing off and/or necessary reliance upon interior splines relative to the inner circular flange relating to the bell housing as above described.

While particular embodiments of the present invention have been shown and described, it will be obvious to those skilled in the art that changes and modifications may be made without departing from this invention in its broader aspects, and within the true spirit and scope of the invention.

I claim:

1. For an automotive automatic transmission having a rear bell housing having threaded apertures, an outer sprag race, a shaft support flange, frangible bolt means bolting said shaft support flange to said bell housing, said outer sprag race having a set of peripheral outer splines, said bell housing having a set of inner splines engaging said outer splines; an improved method of transmission rework when at least one of said spline sets becomes worn, comprising the steps of: removing said bolt means; drilling out the threads of said bell housing apertures, drilling and tapping apertures in said outer sprag race in correspondence with said drilled out apertures, and bolting said shaft support flange through said bell housing apertures to said outer sprag race at the so drilled and tapped apertures thereof, said method including the additional step of providing apertures in said retainer aligned with said tapped apertures of said outer sprag race, and passing said frangible bolts through said retainer apertures to thead into the drilled and tapped apertures of said outer sprag race.

* * * * *